United States Patent Office 3,349,095
Patented Oct. 24, 1967

3,349,095
1 - (5' - NITROFURYL) - 1,3 - DIKETOPROPANE DERIVATIVES AND THEIR PREPARATION
Raphael Ralph G. Haber, Givatayim, and Eva Schoenberger, Ramat Yoseph, Israel, assignors to ABIC Limited, Ramat-Gan, Israel, a corporation of Israel
No Drawing. Filed Mar. 26, 1965, Ser. No. 443,095
Claims priority, application Israel, Apr. 5, 1964, 21,102
9 Claims. (Cl. 260—297)

ABSTRACT OF THE DISCLOSURE

Compounds having antibacterial and antifungal activity, and serving also for the manufacture of pyrazoles and isoxazoles, and of the general formula

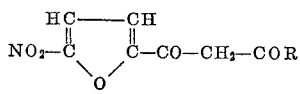

wherein R is a substituted or unsubstituted aryl or heteroaryl radical, such as phenyl, furyl, thienyl and pyridyl radicals, the substituents thereon, when present, being halogen, nitro or lower alkyl, are prepared by treating the non-nitrated analogues with concentrated sulfuric and nitric acids in chloroform at −25° to −18° C.

---

The present invention relates to new 1-(5'-nitrofuryl)-1,3-diketopropane derivatives and to a process for their preparation.

The present invention consists in 1-(5'-nitrofuryl)-1,3-diketopropane derivatives (hereinafter called diktones) of general Formula I

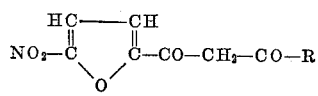

wherein R is a member selected from the group consisting of substituted- and unsubstituted aryl- and heteroaryl radicals.

Preferred aryl and heteroaryl radicals are the phenyl, furyl, thienyl and pyridyl radicals. The substituents with which these radicals are preferably substituted are selected from the group consisting of halogen, nitro and lower alkyl radicals.

In connection with the present specification the term "lower alkyl" embraces those alkyl radicals which contain 1–4 carbon atoms.

The present invention consists also in a process for the preparation of diketones of general Formula I, wherein an 1-furyl-1,3-diketopropane derivative of general Formula II

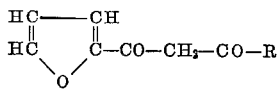

in which R has the same meaning as above, is nitrated.

The nitration of compounds of general Formula II has caused great difficulties. It has been found that the nitration is advantageously carried out at low temperature, preferably at −25 to −18° C., with a mixture of concentrated sulfuric acid and concentrated nitric acid, preferably in a ratio of 5–8 mols of sulfuric acid and 1.2–1.8 mols of nitric acid for each mole of the compound of general Formula II, in an inert solvent, preferably chloroform. The reaction mixture is worked up in a conventional manner, e.g. the mixture is poured on ice, the organic layer which separates is drawn off and the desired diketone is obtained, e.g. by the removal of the solvent by distillation, by precipitation with another solvent or the like.

The 1-furyl-1,3-diketopropane derivatives of general Formula II used as starting materials in the process, according to the present invention, may, for example, be prepared either by the condensation of a furoic acid ester with an appropriate methyl ketone in the presence of a basic reagent, e.g. sodium methoxide, or by the acylation of 2-furyl-methyl ketone with an appropriate ester, also in the persence of a basic reagent.

In connection with the present invention an inert solvent means an organic solvent which is inert towards the reactants and the end product obtained, respectively, in the process according to the present invention.

The new diketones, according to the present invention, are mainly used as starting materials for the preparation of other new valuable compounds, e.g. certain pyrazoles and isoxazoles.

Moreover, the new diketones, according to the present invention, are relatively non-toxic and have antibacterial and antifungi properties.

The antibacterial activity of some of the new diketones is shown in Table I. Table I indicates the minimum inhibitory concentration of the compound under reference in mg./100 cc., as required in order to inhibit the growth of between 1 and 6 strains of each type. The measurements have been carried out by the conventional tube dilution method at 37° C. after 24 hours.

TABLE I

| Compound | Staph. aureus | Shig. sonnei | Shig. flex | E. coli | Salmonella | Cand. albicans | Ps. pyocyanea |
|---|---|---|---|---|---|---|---|
| (5'-nitro-2'-furoyl)-benzoyl-methane | 1–2.5 | 5 | 2.5 | 10 | 10 | 5 | 10 |
| (5'-nitro-2'-furoyl)-2-furoyl-methane | 0.1–0.5 | 2.5 | 2.5 | 5 | 2.5 | 10 | 10 |

The invention will be illustrated by the following examples without being limited by them. All temperatures are indicated in degrees centigrade. All melting points are uncorrected.

Example 1

10.2 g. of difuroyl methane in 185 ml. of dry chloroform were placed in a 500 ml. three-necked flask provided with an alcohol thermometer, a dropping funnel and a mechanical stirrer. The solution was cooled to −20° and 14.7 ml. of concentrated sulfuric acid were added under stirring so that the temperature of the reaction mixture never rose above −20°. Then, while stirring was continued, a solution of 2.8 ml. of concentrated nitric acid in 25 ml. of chloroform was added, whereby the temperature was always kept below −20°. The addition of nitric acid required about half an hour. Thereafter the reaction mixture was stirred for another hour at −20°, then 70 g. of crushed ice were added and the reaction mixture was stirred for a further two hours. The mixture was then filtered and the filtrate obtained separated in two layers in a separatory funnel. The organic layer obtained was washed with a potassium bicarbonate solution and the aqueous layer obtained was extracted thrice with portions of 60 ml. of chloroform. The combined organic layers were dried and the chloroform was then distilled off. The crude compound remaining was recrystallised from isopropanol and 4.4 g. of a yellowish crystalline compound, (5′-nitro-2′-furoyl)-2-furoyl-methane were obtained. A further 1.69 g. of the diketone were recovered from the isopropanol solution by way of concentration. The two crops were recrystallised from acetone yielding a compound of M.P. 171–175°.

An analytical sample having a M.P. of 173–177° was prepared.

The analysis was calculated for $C_{11}H_7O_6N$—Calculated: C, 52.91%; H, 3.03%; N, 5.60%; O, 38.45%. Found: C, 52.73%; H, 2.95%; N, 5.71%; O, 38.56%.

*Example 2*

In the same manner as described in Example 1, furoyl benzoyl methane dissolved in chloroform was nitrated with a mixture of concentrated sulfuric acid and concentrated nitric acid. The yield of the crude (5′-nitro-2′-furoyl)-benzoyl-methane obtained was 60%. After recrystallisation from isopropanol with charcoal the yield of the pure compound was 26%, M.P. 155–156°.

An analytical sample having a M.P. of 158–159° was prepared.

The analysis was calculated for $C_{13}H_9O_5N$—Calculated: C, 60.25%; H, 3.5%; N, 5.40%; O, 30.86%. Found: C, 59.98%; H, 3.4%; N, 5.56%; O, 31.03%.

*Example 3*

7 g. of furoyl-p-chloro-benzoyl-methane were dissolved in 110 ml. of chloroform and the solution obtained was cooled to −20°. 10.5 ml. of concentrated sulfuric acid were added to the cooled solution so that the temperature was always kept below −20°. Thereafter a solution of 2.1 ml. of concentrated nitric acid in 17 ml. of chloroform was added to the reaction mixture, whereby the temperature was always kept below −20°. The mixture was then kept for 1½ hours at −20°, thereafter 35 g. of crushed ice were added and the reaction mixture was left to stay overnight. Two layers were obtained which were separated from each other. The aqueous layer was washed with chloroform and the combined chloroform solutions were washed with a potassium bicarbonate solution, dried and then the chloroform was distilled off. A yellow compound, (5′-nitro-2′-furoyl)-p-chloro-benzoyl-methane was obtained. After recrystallisation from methanol 1.95 g. of the diketone having a M.P. of 170–175° were obtained. A pure sample had a M.P. of 175.5°.

*Example 4*

In the same manner as described in Example 3, furoyl-p-toluyl-methane dissolved in chloroform was nitrated with a mixture of concentrated sulfuric acid and concentrated nitric acid. The yield of the crude (5′-nitro-2′-furoyl)-p-toluyl-methane obtained was 53.5%, M.P. 128–130°.

An analytical sample having a M.P. of 145–146° was prepared by recrystallisation from ethanol and acetonitrile. The analysis was calculated for $C_{14}H_{11}O_5N$—Calculated: C, 61.54%; H, 4.06%; N, 5.13%. Found: C, 61.39%; H, 4.08%; N, 5.21%.

*Example 5*

In the same manner as described in Example 3, furoyl-p-bromo-benzoyl methane dissolved in chloroform was nitrated with a mixture of concentrated sulfuric acid and concentrated nitric acid. The yield of the (5′-nitro-2′-furoyl)-p-bromobenzoyl-methane obtained was 25%.

An analytical sample having a M.P. of 172–173° was prepared by recrystallisation from isopropanol. The analysis was calculated for $C_{13}H_8O_3NBr \cdot H_2O$—Calculated: C, 43.84%; H, 2.83%; N, 3.93%; Br, 22.44%. Found: C, 43.70%; H, 3.03%; N, 3.79%; Br, 22.36%.

*Example 6*

In a manner analogous to that described in Example 3 the following compounds were prepared:

(a) (5′-nitro-2′-furoyl)-nicotinoyl-methane, M.P. 175°;
(b) (5′-nitro-2′-furoyl)-picolinoyl-methane, M.P. 171°;
(c) (5′-nitro-2′-furoyl)-2-thenoyl-methane.

We claim:
1. Diketones of the general formula

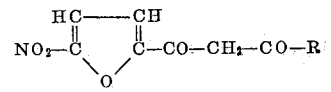

in which R is a member selected from the group consisting of phenyl, halophenyl, lower alkyl-substituted phenyl, pyridyl, furyl and thienyl.

2. (5′-nitro-2′-furoyl)-2-furoyl-methane.
3. (5′-nitro-2′-furoyl)-benzoyl-methane.
4. (5′-nitro-2′-furoyl)-p-chlorobenzoyl-methane.
5. (5′-nitro-2′-furoyl)-p-bromobenzoyl-methane.
6. (5′-nitro-2′-furoyl)-p-toluyl-methane.
7. (5′-nitro-2′-furoyl)-nicotinoyl-methane.
8. (5′-nitro-2′-furoyl)-picolinoyl-methane.
9. (5′-nitro-2′-furoyl)-2-thenoyl-methane.

References Cited

UNITED STATES PATENTS 2,792,424   5/1957   Weesner _____ 260—610

OTHER REFERENCES

Le Grand et al.: J. Am. Chem. Soc., vol. 75, pages 3862–4 (1953).

WALTER A. MODANCE, *Primary Examiner.*

A. ROTMAN, *Assistant Examiner.*